United States Patent
Kohler et al.

(10) Patent No.: US 8,251,391 B2
(45) Date of Patent: Aug. 28, 2012

(54) REMOVABLE WHEEL SUPPORT DEVICE FOR A WHEELCHAIR

(75) Inventors: Thomas Markus Kohler, Munchenstein (CH); Martin Primosig, Basel (CH)

(73) Assignee: Invacare Corporation, Elyria, OH (US)

( * ) Notice: Subject to any disclaimer, the term of this patent is extended or adjusted under 35 U.S.C. 154(b) by 687 days.

(21) Appl. No.: 12/095,877

(22) PCT Filed: Nov. 28, 2006

(86) PCT No.: PCT/IB2006/054488
§ 371 (c)(1),
(2), (4) Date: Jun. 2, 2008

(87) PCT Pub. No.: WO2007/066256
PCT Pub. Date: Jun. 14, 2007

(65) Prior Publication Data
US 2008/0309048 A1 Dec. 18, 2008

(30) Foreign Application Priority Data

Dec. 5, 2005 (EP) .................................. 05405686

(51) Int. Cl.
*B62M 1/14* (2006.01)
(52) U.S. Cl. .................. 280/250.1; 280/242.1; 16/18 R; 16/30
(58) Field of Classification Search .............. 16/18 R, 16/20, 22, 30, 31 A, 45; 297/440.21; 280/250.1, 280/242.1, 30
See application file for complete search history.

(56) References Cited

U.S. PATENT DOCUMENTS

| | | | | |
|---|---|---|---|---|
| 342,930 A * | 6/1886 | Raymond | ........................ | 16/38 |
| 1,614,894 A * | 1/1927 | Nelson et al. | ................. | 16/18 R |
| 1,953,636 A * | 4/1934 | Skelton | .............................. | 16/30 |
| 2,282,506 A * | 5/1942 | Wachter | ............................. | 16/44 |
| 3,210,795 A * | 10/1965 | Fontana et al. | .................... | 16/43 |
| 3,713,186 A * | 1/1973 | Cartwright | ........................ | 16/45 |
| 4,362,311 A | 12/1982 | Bergman | | |
| 4,722,114 A * | 2/1988 | Neumann | ..................... | 16/35 R |
| 5,141,250 A | 8/1992 | Morgan et al. | | |
| 5,568,671 A * | 10/1996 | Harris et al. | .................. | 16/18 R |
| 5,594,974 A * | 1/1997 | Wattron et al. | ................... | 16/30 |
| 5,727,285 A * | 3/1998 | Goman | ............. | 16/38 |
| 6,212,733 B1 * | 4/2001 | Yeh | ............................. | 16/35 R |
| 6,402,166 B1 * | 6/2002 | Chiu | ........................... | 280/47.38 |
| 6,588,059 B1 * | 7/2003 | McCord | ........................... | 16/30 |
| 6,648,415 B2 * | 11/2003 | Bartels | ......................... | 297/391 |
| 6,944,910 B2 * | 9/2005 | Pauls | ............................ | 16/35 D |
| 7,308,730 B2 * | 12/2007 | Chou | ............................. | 16/21 |
| 7,311,160 B2 * | 12/2007 | Lim | ............................. | 180/9.26 |
| 7,353,566 B2 * | 4/2008 | Scheiber et al. | .................. | 16/19 |
| 2003/0122332 A1 * | 7/2003 | Engels et al. | ............. | 280/47.38 |

* cited by examiner

*Primary Examiner* — Lesley D Morris
*Assistant Examiner* — Maurice Williams
(74) *Attorney, Agent, or Firm* — Calfee, Halter & Griswold LLP

(57) ABSTRACT

Stem (12) is secured to fork (6). Head (27), bearing surface (28), recessed portions (29 and 21), and bearing surface (31) successively engage the interior of housing (13), comprising first bearing (14), laterally movable locking ring (18) and second bearing (15). Locking ring (18) is repelled to the left in diametral direction against spring means urging ring (18). When shoulder (20) has arrived at the height of rim portion (32) of ring (18) the spring means are released. Ring (18) displaces to the right and portion (32) engages groove (29) thus locking the stem in the axial direction. Due to the side location of the button 9, the device can easily be handled using the palm of a hand.

6 Claims, 5 Drawing Sheets

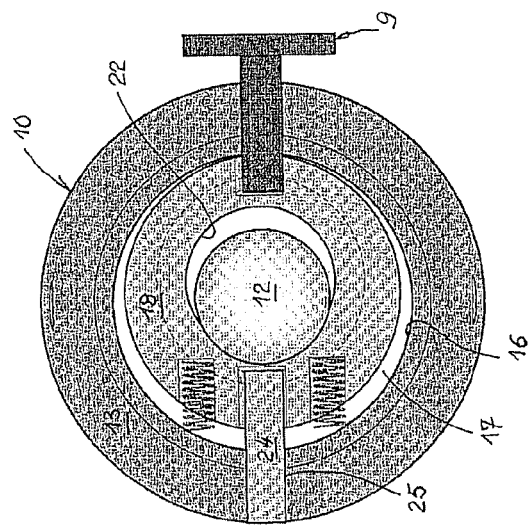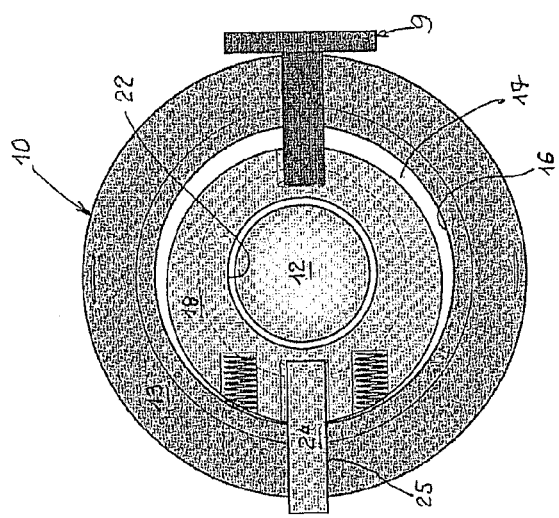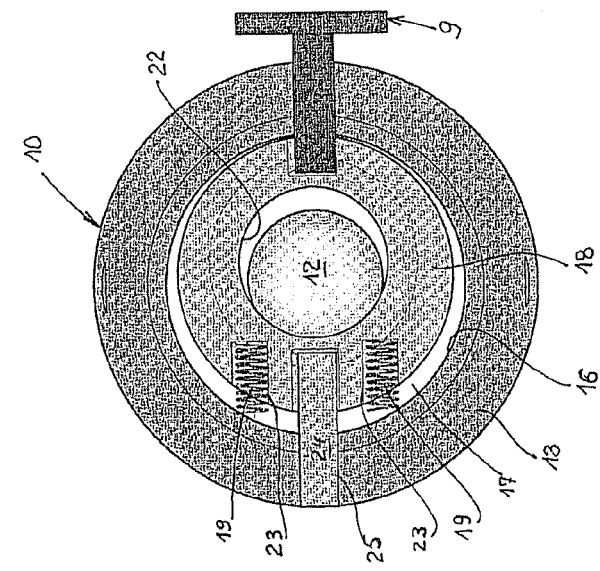

REMOVABLE WHEEL SUPPORT DEVICE FOR A WHEELCHAIR

TECHNICAL FIELD

The present invention relates to a removable wheel support device for a wheelchair having at least one front wheel.

BACKGROUND OF THE INVENTION

Persons of restricted mobility, or suffering from certain handicaps often use wheelchairs which are provided with at least one front wheel, usually two. Among said known wheelchairs, in particular among light weighted hand operated wheelchairs, some are provided with removable front wheel support devices, allowing the replacement of the front wheels, for example to adapt the use of the wheelchair to the inside and to the outside of the house. Up to now however, such devices permitting to remove the front wheels are difficult in handling.

Thus the object of the present invention is to propose an improved front wheel support device able to be released from the frame of the wheelchair with a unique and simple movement of one hand, even for a disabled person.

SUMMARY OF THE INVENTION

With this end in view the present invention is concerned with a removable wheel support device for a wheelchair having at least one front wheel, comprising a bearing assembly having a fixed part secured to a frame part of the seat and a rotative part with a stem integral with a fork holding said wheel, wherein the fixed part comprises a pair of guiding bearing elements coaxially mounted in a housing and, between them, a locking ring with an excentric bore, said ring being laterally movable under the action of a lateral driving member, said stem being arranged for axially engaging said bearing elements and said locking ring, and having a shoulder with a circular edge which abuts an excentric rim of said bore in said locking ring when the latter is in a locking position within said bearing assembly.

The locking ring may be of a circular cylindrical shape and lodged in a free space in said housing element between said bearing elements and may be guided for diametral movements by a radial pin engaging said ring and traversing a radial pin bore in said bearing housing, said driving member having a side tip secured to said locking ring, and traversing a hole in said housing diametrically opposed to the pin bore.

The driving member may act as a push button and spring means may be provided for returning driving member and locking member in the locking position after a displacement under the action of the driving member.

Said spring means may comprise two helicoidal spring elements located in parallel cylindrical recesses of said locking ring on both sides of said radial pin bore.

Said stem may comprise a pair of coaxial cylindrical guiding portions each of which engages one of said bearing elements in the locking position and between them a recess portion comprising a groove with a cylindrical bottom adjacent to said shoulder and joining one of said cylindrical portions, and a frustoconical portion extending from said groove to the other one of said cylindrical portions.

BRIEF DESCRIPTION OF THE DRAWINGS

A preferred embodiment of the present invention will be described hereafter by way of example and with reference to the drawing wherein:

FIG. 7 to 9 are schematic cross sectional views perpendicularly to the device axis, showing the same functioning states as FIG. 4 to 6, and FIG. 10 to 12 are enlarged cross sectional views of the bearing assemblies shown in FIG. 4 to 6, along planes passing on the one part through one of the springs elements and on the other part through the driving member.

EMBODIMENT OF THE PRIOR ART

Figure 1:
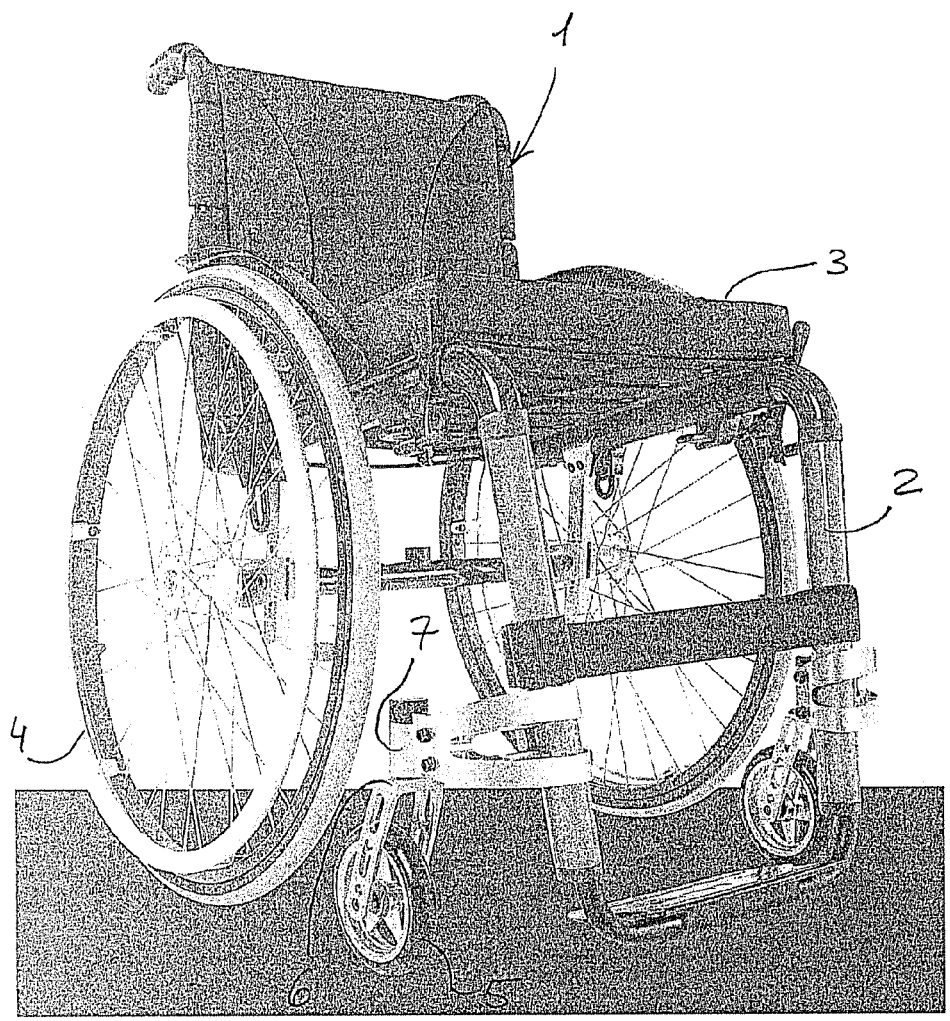
FIG. 1 is a general perspective view of a wheelchair with two front wheels according to the prior art.

FIG. 1 shows a wheelchair 1 of the prior art, with a frame 2, a seat 3, two main supporting wheels 4 and a pair of front wheels 5 which are connected to the frame 2 by fork assemblies 6 and bearing assemblies 7 with vertical axis.

Figure 2:
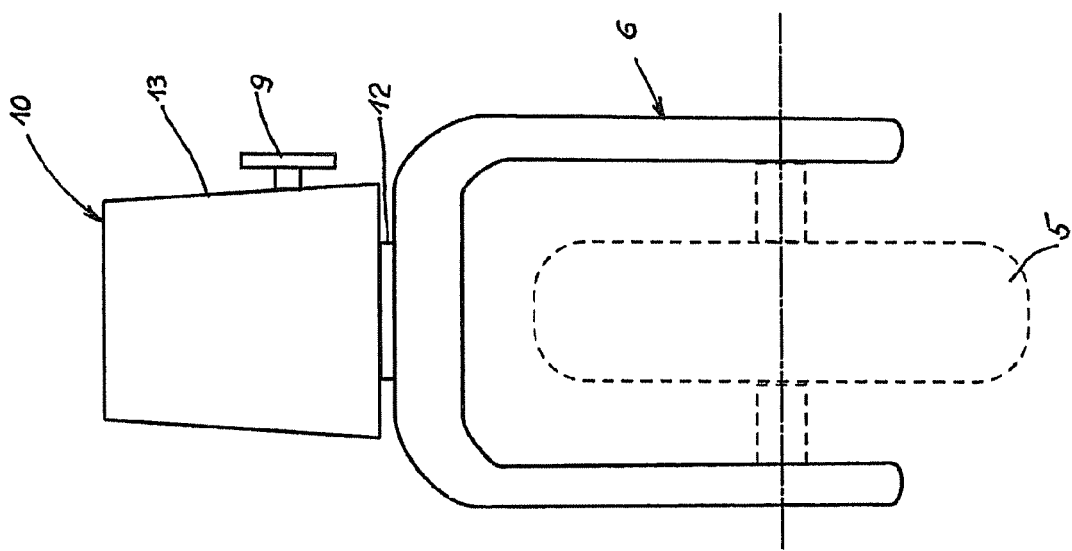
FIG. 2 is a schematic enlarged view of a removable wheel support device according to the prior art.
Figure 3:
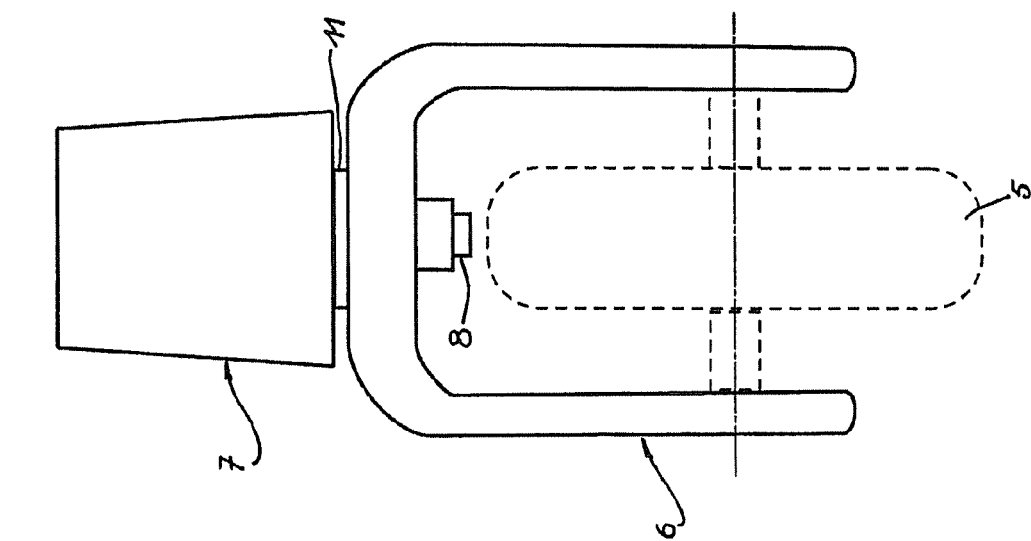
FIG. 3 is a schematic enlarged view of a removable wheel support device according to the resent invention.

As mentioned above, it is in some cases desirable to remove the front wheels, and to this end attempts have been made to conceive readily removable wheel support devices provided with quick release fixing devices as illustrated on FIG. 2. As illustrated in FIG. 2, a wheel 5 pivotes in a fork 6 secured to a vertical pivot stem 11 removably held in a bearing assembly 7, the fixed part of which is secured to the frame of the seat. In these known devices, a push driving button 8, mounted in the lower part of stem 11 permits to release the quick release fixing device, to remove the wheel assembly. However this system is cumbersome and difficult to handle, necessitating to be pushed with a finger due to the location of the push driving button 8. Such a handling is still more difficult, or even in some cases impossible, for a disabled person.

EMBODIMENT OF THE INVENTION

FIG. 3 to 12 show an example of the improved system. Wheel 5 and fork 6 can be the same as in the embodiment of FIG. 2, but whereas bearing assembly 10 and driving push button 9 will be explained now. A stem 12, secured at its lower end to fork 6 is held in a bearing housing 13 in such a manner that it can pivote coaxially to the axis of housing 13. A button 9 laterally mounted on housing 13 constitutes a driving member and permits to release the stem 12 from the housing 13 and therefore to remove the steering wheel 5 by pressing button 9, which, due to its lateral location on the housing 13, does not necessitate to be handle by a finger, but can merely be pressed by the palm of the hand.

Figure 4:
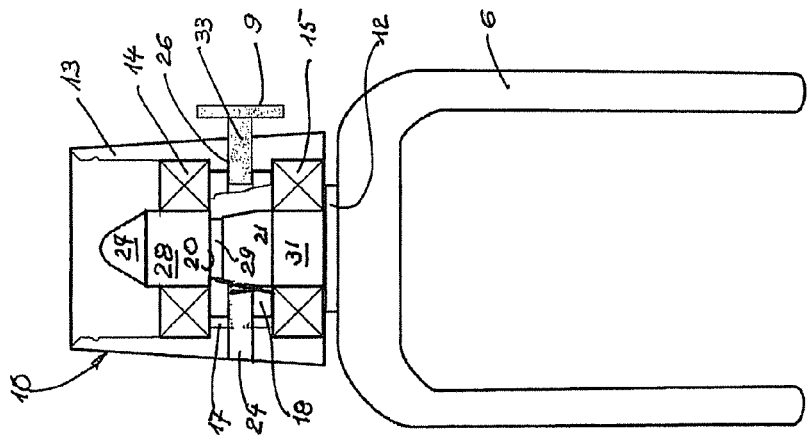
FIG. 4 to 6 are schematic cross sectional views of the support device of FIG. 3, along planes determined by the axis of the stem and of the driving member, showing three different functioning states of the device.
Figure 5:
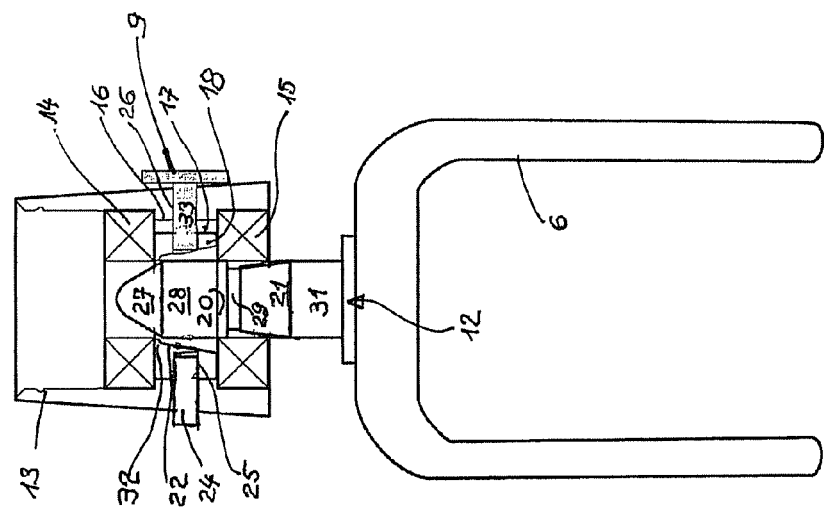
Figure 6:
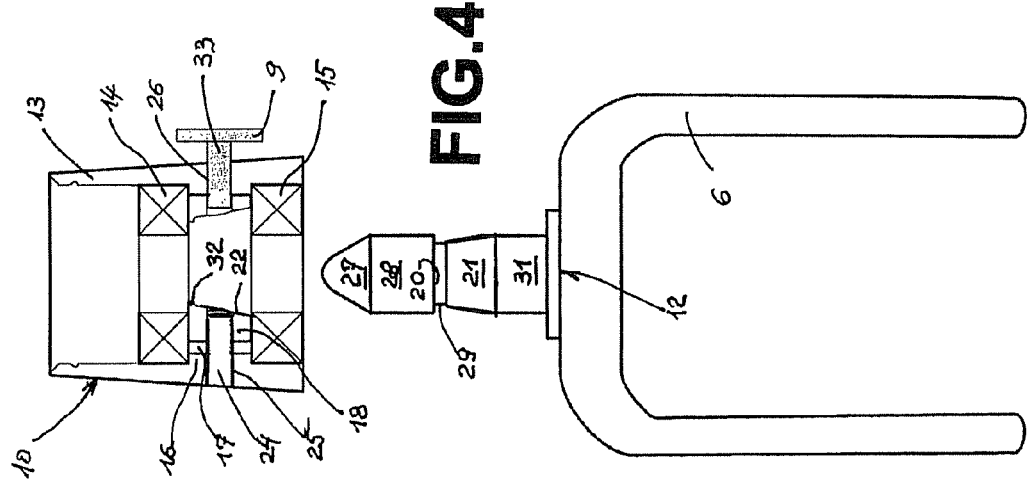

FIG. 4 to 6 show the main constituent parts of the device in three functioning states. Housing 13 is a tubular part with an inner face forming two coaxial cylindrical portions receiving each one of two bearing elements 14 and 15, for example ball bearings, the inner races of which are coaxial and have the same diameter. Housing 13 comprises an intermediate portion 16 of reduced diameter separating bearings 14 and 15 and defining a space 17 large enough for lodging a laterally movable ring 18 functioning as a locking ring for the stem 12. This ring 18 is driven by button 9 in one direction and repelled to its initial position under the action of spring means 19 (FIG. 7 to 9). FIG. 4 shows the relative positions of stem 12 and bearing assembly 10 at the moment the front wheel support is ready for inserting stem 12 into the bearing housing 13. FIG.

5 shows an insertion position of stem 12. Ring 18 is displaced laterally within space 17, which displaces driving button 9 towards the face of housing 13. According to FIG. 6, when stem 12 is entirely inserted within both bearing elements 14, 15, an annular shoulder 20 of stem 12, limiting a groove portion 29, is flush with the lower edge of bearing element 14 and therefore movable ring 18 is free to move within space 17 and returns to its original position as in FIG. 4, stem 12, as illustrated in FIG. 6, being thus locked. The displacing movements of ring 18 are guided by a direction pin 24 secured to said ring and freely sliding into a radial through hole 25 in housing 13. Diametrically opposed to through hole 25 is a through hole 26 in housing 13 and a recess in ring 18, which hold and guide a tip 33 secured to button 9. This also guides ring 18.

As shown in FIG. 7 to 9, intermediate portion 16 of housing 13 has a cylindrical inner face coaxial with the outer face of housing 13. This inner cylindrical face forms the outer limit of free space 17. Ring 18 has a cylindrical outer face with a diameter somewhat shorter than diameter of freespace 17 and an axially directed excentrical through bore 22, the outline of which will be explained later. FIGS. 7 and 9 show the position of movable ring 18 according to FIGS. 4 and 6. The spring means 19 consist of two helicoidal spring elements located in parallel recesses 23 of ring 18 and leaning back against inner face of recessed portion 16 of housing 13. The successive positions of ring 18, driving button 9 and springs 19 corresponding to functioning states of FIGS. 4, 5 and 6 respectively appear in FIGS. 7, 8, and 9 respectively.

Figure 10:
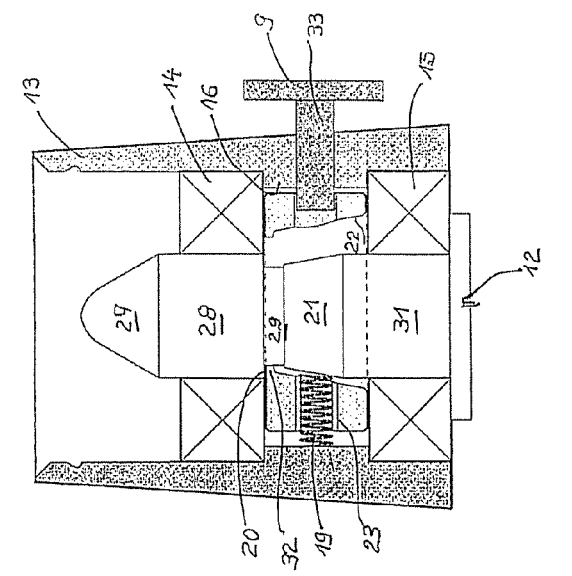
Figure 11:
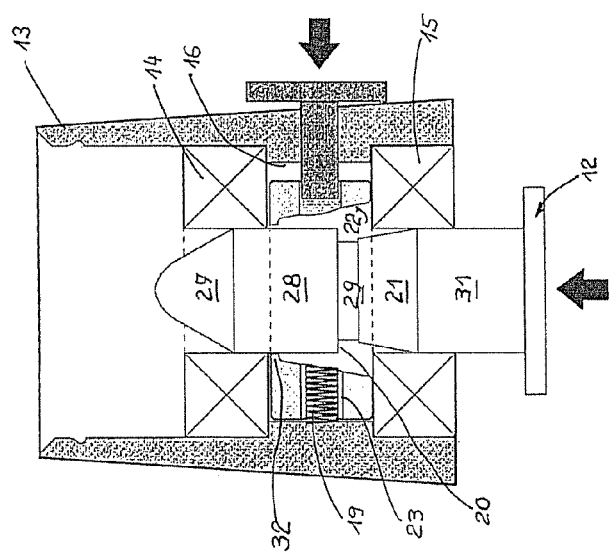
Figure 12:
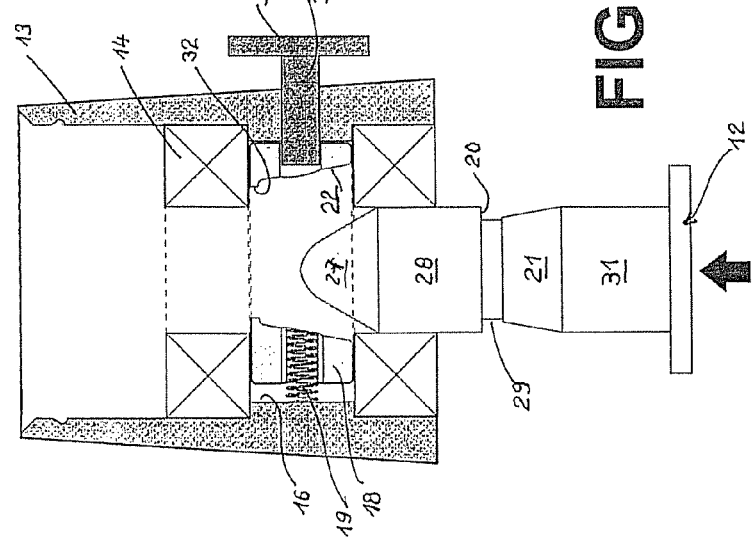

Finally, FIG. 10 to 12 illustrate in more details the outlines of excentric bore 22 and of stem 12. It is here recalled that, as already mentioned, FIG. 10 to 12 are cross sectional views along planes passing on the one part through one of the spring elements and on the other part through the driving member. Housing 13, bearing elements 14, 15, and intermediate portion 16 are shown as well as one of the springs 19 and driving button 9 with its tip member 33 engaging radial hole 26. Stem 12 comprises a front head portion 27 of conical shape, a first cylindrical portion 28 having a height corresponding to the height of bearing element 14 and a diameter adapted to the inner diameter of bearings elements 14, 15 in such a manner that the stem can slide in the bearings when inserted into housing 13. Cylindrical part 28 is ending with shoulder 20. As already explained this shoulder forms the upper edge of recessed portion 29, 21. The latter comprises first a groove 29 with cylindrical bottom and then a frustoconical surface 21 joining a second cylindrical portion 31 engaging bearing element 15 simultaneously with portion 28 engaging bearing 14.

Now the outline of bore 22 comprises, from the upper plane front surface of ring 18, a first narrow cylindrical portion 32 of a diameter corresponding to inner opening of bearing elements 14, 15 and then a downwardly enlarging portion 34, of frustoconical shape extending down to the lower face of ring 18. It appears from FIGS. 10 and 11 that when cylindrical portion 28 of stem 12 engages bearing element 15, head portion 27 strikes frustoconical portion 34 of ring 18 and repels the latter against the action of spring elements 19 until cylindrical surface portion 28 enters bearing element 14. When both cylindrical portions 28 and 31 are in place in bearing elements 14 and 15 (FIG. 12), springs 19 repel movable locking ring 18 to the right (shown position FIG. 12). Narrow cylindrical portion 32 of ring 18 partially engages under shoulder 20 and enters groove 29 due to the displacement of ring 18, which locks the stem axially.

Stem 12 thus forms the pivoting member permitting to guide the fork 6 and therefore to place the front wheels of the wheelchair in the desired direction.

Pressing with one hand on driving button 9 pushes locking ring to the left whereby stem 12 is free again and the front wheel arrangement can be withdrawn from the frame of the seat.

The invention claimed is:

1. Removable wheel support device for a wheelchair having at least one front wheel, comprising a bearing assembly having a fixed part secured to a frame part of a seat and a rotative part with a stem integral with a fork holding said wheel, wherein the fixed part comprises a pair of guiding bearing elements coaxially mounted in a housing and a locking ring with an axially directed excentrical bore, said locking ring being of a circular cylindrical shape, being lodged in a free space in said housing between said bearing elements and being laterally movable relative to said housing under the action of a lateral driving member, said stem being arranged for axially engaging said bearing elements and said locking ring, and having a shoulder with a circular edge which abuts an excentric rim of said bore in said locking ring when said locking ring is in a locking position within said bearing assembly, wherein the locking ring is guided for diametral movements by a radial pin engaging said ring and traversing a radial pin bore in said housing, said driving member having a side tip secured to said locking ring, and traversing a hole in said housing diametrically opposed to the pin bore.

2. Wheel support device as claimed in claim 1, wherein the driving member acts as a push button in that spring means are provided for returning the driving member and the locking ring in the locking position after a displacement under the action of the driving member.

3. Wheel support device as claimed in claim 2, wherein said spring means comprise two helicoidal spring elements located in parallel cylindrical recesses of said locking ring on both sides of said radial pin bore.

4. Wheel support device as claimed in claim 1, wherein said stem comprises a pair of coaxial cylindrical guiding portions each of which engages one of said bearing elements in the locking position and between them a recess portion comprising a groove with a cylindrical bottom adjacent to said shoulder and joining one of said cylindrical portions, and a frustoconical portion extending from said groove to the other one of said cylindrical portions.

5. Removable wheel support device for a wheelchair having at least one front wheel, comprising a bearing assembly having a fixed part secured to a frame part of a seat and a rotative part with a stem integral with a fork holding said wheel, wherein the fixed part comprises a pair of guiding bearing elements coaxially mounted in a housing and a locking ring with an axially directed excentrical bore, said locking ring being of a circular cylindrical shape, being lodged in a free space in said housing between said bearing elements and being laterally movable relative to said housing under the action of a lateral driving member, said stem being arranged for axially engaging said bearing elements and said locking ring, and having a shoulder with a circular edge which abuts an excentric rim of said bore in said locking ring when said locking ring is in a locking position within said bearing assembly, wherein the driving member acts as a push button in that spring means are provided for returning the driving member and the locking ring in the locking position after a displacement under the action of the driving member, and wherein said spring means comprise two helicoidal spring elements located in parallel cylindrical recesses of said locking ring on both sides of a radial pin bore.

6. Wheel support device as claimed in claim 5, wherein said stem comprises a pair of coaxial cylindrical guiding portions each of which engages one of said bearing elements in the locking position and between them a recess portion comprising a groove with a cylindrical bottom adjacent to said shoulder and joining one of said cylindrical portions, and a frusto-conical portion extending from said groove to the other one of said cylindrical portions.

* * * * *